United States Patent
Nishioka et al.

(10) Patent No.: US 10,168,689 B2
(45) Date of Patent: Jan. 1, 2019

(54) MACHINE TOOL

(71) Applicant: DMG Mori Co., LTD., Nara (JP)

(72) Inventors: Takayuki Nishioka, Nara (JP);
Tetsushi Asada, Nara (JP)

(73) Assignee: DMG Mori Co., Ltd., Nara (JP)

( * ) Notice: Subject to any disclaimer, the term of this patent is extended or adjusted under 35 U.S.C. 154(b) by 203 days.

(21) Appl. No.: 15/322,358

(22) PCT Filed: May 25, 2015

(86) PCT No.: PCT/JP2015/064927
§ 371 (c)(1),
(2) Date: Dec. 27, 2016

(87) PCT Pub. No.: WO2016/031324
PCT Pub. Date: Mar. 3, 2016

(65) Prior Publication Data
US 2017/0176980 A1    Jun. 22, 2017

(30) Foreign Application Priority Data
Aug. 26, 2014  (JP) .................. 2014-171204

(51) Int. Cl.
*B23Q 3/157*  (2006.01)
*G05B 23/02*  (2006.01)
(Continued)

(52) U.S. Cl.
CPC ... *G05B 19/40938* (2013.01); *B23Q 3/15503* (2016.11); *B23Q 3/15533* (2013.01);
(Continued)

(58) Field of Classification Search
CPC ............ B23Q 3/15503; B23Q 3/15533; B23Q 17/0995; G05B 23/027; Y10T 483/12;
(Continued)

(56) References Cited

U.S. PATENT DOCUMENTS

2013/0331245 A1 * 12/2013 Koike ................ B23Q 3/15526
483/54

FOREIGN PATENT DOCUMENTS

DE          10236342 A1 *   2/2004   ........ B23Q 3/15526
JP          08318443 A      12/1996
(Continued)

*Primary Examiner* — Erica E Cadugan
*Assistant Examiner* — Michael Vitale
(74) *Attorney, Agent, or Firm* — Miller, Matthias & Hull LLP

(57) ABSTRACT

A machine tool (1) includes a tool information storage (9) storing therein used tool information for, when an NC program execution part (5) executes an NC program, specifying a tool used for machining, and a magazine operation panel (18) includes an announcement part (18*b*) for announcing an alarm to an operator. When receiving an operation signal from an input part (18*a*) while the NC program execution part (5) is executing an NC program, a tool change control part (11) checks the used tool information stored in the tool information storage (9), and in the case where a tool held by a tool pot (17*a*) corresponding to the operation signal is not used for machining, moves the tool pot (17*a*) to a tool attachment/detachment position (17*c*), and in the case where the tool is used for machining, causes the announcement part (18*a*) to announce an alarm indicating that it is unavailable.

18 Claims, 3 Drawing Sheets

(51) Int. Cl.
  *G05B 19/4065* (2006.01)
  *G05B 19/4093* (2006.01)
  *B23Q 17/09* (2006.01)
  *B23Q 3/155* (2006.01)

(52) U.S. Cl.
  CPC ..... *B23Q 3/15546* (2013.01); *B23Q 3/15713* (2013.01); *B23Q 17/0995* (2013.01); *G05B 23/027* (2013.01); *G05B 2219/32422* (2013.01); *Y10T 483/12* (2015.01); *Y10T 483/136* (2015.01); *Y10T 483/14* (2015.01)

(58) Field of Classification Search
  CPC ............. Y10T 483/123; Y10T 483/127; Y10T 483/13; Y10T 483/132; Y10T 483/134; Y10T 483/136; Y10T 483/138; Y10T 483/14
  USPC ...... 483/4, 5, 6, 7, 8, 9, 10, 11, 12; 700/179
  See application file for complete search history.

(56) References Cited

FOREIGN PATENT DOCUMENTS

| | | | |
|---|---|---|---|
| JP | 11-262831 A | * | 9/1999 |
| JP | 11239940 A | | 9/1999 |
| JP | 2005199379 A | | 7/2005 |
| JP | 2013538698 A | | 10/2013 |

* cited by examiner

FIG. 2

| Tool No. | Tool Pot No. | Tool Name | Dimension | | Applied Program | Machining Time (h) | Cumulative Machining Time (h) | Limit Machining Time (h) | UNAVAILABLE Flag |
|---|---|---|---|---|---|---|---|---|---|
| | | | Diameter (mm) | Length (mm) | | | | | |
| 001 | 001 | drill | 6.8 | 100 | O1000 | 0.05 | 56.1 | 100 | ON |
| | | | | | O1020 | 0.15 | | | |
| | | | | | O1040 | 0.1 | | | |
| 002 | 002 | end mill | 20 | 70 | O1000 | 0.3 | 212.7 | 400 | ON |
| | | | | | O1020 | 0.4 | | | |
| 003 | 003 | boring | 90 | 300 | O1020 | 0.09 | 143.4 | 300 | OFF |
| | | | | | O1030 | 0.07 | | | |
| | | | | | O1040 | 0.12 | | | |
| ... | ... | ... | ... | ... | ... | ... | ... | ... | ... |
| 020 | 020 | face mill | 100 | 60 | O1000 | 0.4 | 121.2 | 300 | ON |
| | | | | | O1020 | 0.2 | | | |
| | | | | | O1030 | 0.6 | | | |

MACHINE TOOL

TECHNICAL FIELD

The present invention relates to a machine tool including a motion mechanism part that includes a spindle, a numerical controller that numerically controls operation of the motion mechanism part in accordance with an NC program, and a tool changer that changes a tool attached to the spindle with another tool.

BACKGROUND ART

It is known that a conventional typical tool changer is composed of a tool magazine having a plurality of tool holders holding tools, a magazine driving mechanism driving the tool magazine to move one of the tool holders to a tool change position, a tool changing mechanism changing a tool attached to a spindle with a tool positioned at the tool change position, and a tool change control part controlling operations of the magazine driving mechanism and tool changing mechanism (see Japanese Unexamined Patent Application Publication No. H8-318443).

In such a tool changer, attachment of tools to the tool holders and detachment of tools from the tool holders, which are set-up operations, are manually performed by an operator. In the case of a tool magazine having a number of tool holders, a tool attachment/detachment position for the attachment and detachment of tools by the operator is set and a manual operation device for inputting into the tool change control part an operation signal for selectively moving a particular one of the plurality of tool holders to the tool attachment/detachment position is provided.

In such a tool changer, the operator designates a tool holder to be operated through the manual operation device, whereby an operation signal for moving the designated tool holder to the tool attachment/detachment position is transmitted from the manual operation device to the tool change control part. Under control by the tool change control part, the magazine driving mechanism is driven and thereby the designated tool holder is moved to the tool attachment/detachment position. Thus, the operator can call an intended tool holder to the tool attachment/detachment position through this operation and can attach a tool to the tool holder or detach a tool from the tool holder.

By the way, the set-up operation includes other types of operations, such as an operation of, when a new machining operation that has not been executed in the machine tool is performed using newly set tools, attaching the newly set tools to the tool holders, which is a set-up operation performed before the machining operation is started, and an operation of, when a tool has reached its wear limit through machining, exchanging the tool which has reached its wear limit with a new one. Note that the tool exchange timing is typically managed by keeping track of a cumulative machining time of each tool. Each tool has an empirically set limit machining time that is regarded as its wear limit, and the exchange timing for each tool is set based on its limit machining time and a tool which has reached its exchange timing is exchanged by the operator.

Further, a numerical controller of a machine tool typically stores therein a plurality of NC programs and multiple kinds of machining operations corresponding to the NC programs are executed in the machine tool. Therefore, a plurality of tools which are used in the machining operations are previously stored into the tool magazine; some of the tools are shared by several machining operations and others are used in one machining operation.

Because of these backgrounds, conventionally, a tool which has reached its machining limit is exchanged not only while the machine tool is stopped but also while a machining operation is performed. That is, the tool magazine holds tools which are not used in the machining operation; therefore, exchanging such a tool during the machining operation does not affect the machining operation.

CITATION LIST

Patent Literature

Patent document 1: Japanese Unexamined Patent Application Publication No. H8-318443

SUMMARY OF INVENTION

Technical Problem

However, there has been a problem that, when the tool exchange is manually performed during a machining operation, the operator errouneously inputs a tool holder to be called into the manual operation device and thereby a tool used in the machining operation is called to the tool attachment/detachment position.

In the case where the tool exchange is manually performed by manually operating the tool magazine with the manual operation device during a machining operation, there is a possibility that, during the tool exchange, an automatic tool change command is transmitted from the numerical controller to the tool change control part and thereby an automatic tool change operation is executed. In this case, if the automatic tool change operation is executed after the tool exchange manually performed by the operator is completed, this is not a serious problem. However, if the automatic tool change operation is executed on the tool holder positioned at the tool attachment/detachment position before the operator attaches a new tool to the tool holder after detaching a tool from the tool holder, because no tool is attached to the tool holder, there is a problem that the automatic tool change operation is interrupted, and consequently the machining operation is interrupted.

If a machining operation is interrupted, for resuming the machining operation after the interruption, it is necessary to perform a bothersome operation of returning the components of the machine tool to their respective original positions, operating them so that they reach a pre-interruption, ordinary state, and then resuming the NC program from the point of the interruption. Further, there is a problem that availability of the machine tool is reduced due to the interruption of the machining operation.

The present invention has been achieved in view of the above-described circumstances and an object thereof is to provide a machine tool which is capable of, when an operator performs an erroneous operation during an operation using a manual operation device, allowing the operator to recognize the erroneous operation and preventing a tool magazine from being driven in accordance with the erroneous operation.

Solution to Problem

The present invention, for solving the above-described problems, relates to a machine tool including a motion mechanism part including a spindle, a numerical controller numerically controlling operation of the motion mechanism part in accordance with an NC program, and a tool changer changing a tool attached to the spindle with another tool, the tool changer including:

a tool magazine having a plurality of tool holders holding tools;

a magazine driving mechanism driving the tool magazine to move one of the tool holders to a tool change position for changing a tool attached to the spindle and to a tool attachment/detachment position for manually attaching or detaching a tool to or from the tool holder;

a tool changing mechanism changing a tool attached to the spindle with a tool positioned at the tool change position;

a tool change control part controlling operations of the magazine driving mechanism and the tool changing mechanism; and a manual operation device inputting into the tool change control part an operation signal for selectively moving a particular one of the plurality of tool holders to the tool attachment/detachment position, the machine tool further including a tool information storage storing therein used tool information for, when the numerical controller executes an NC program, specifying a tool used in a machining operation using the NC program, the manual operation device including an announcement part for announcing an alarm to an operator, and the tool change control part being configured to check the used tool information stored in the tool information storage when receiving the operation signal from the manual operation device during execution of an NC program by the numerical controller, and, in a case where the tool held by the tool holder corresponding to the operation signal is not used in the NC program, move the tool holder to the tool attachment/detachment position and, in a case where the tool held by the tool holder corresponding to the operation signal is used in the NC program, cause the announcement part to announce an alarm.

In this machine tool, an automatic tool change operation and a manual operation are performed, the automatic tool change operation being performed by the numerical controller executing a tool change code included in an NC program, the manual operation being executed by the operator through the manual operation device.

The automatic tool change operation is executed by the numerical controller executing a tool change code included in an NC program and transmitting a tool change command corresponding to the tool change code to the tool change control part. The tool change control part having received the tool change command drives the tool changing mechanism so as to change a tool attached to the spindle with a next tool positioned at the tool change position. Further, the positioning of the next tool at the tool change position is performed by the numerical controller executing a tool designation code included in the NC program. That is, the numerical controller recognizes a tool to be used next by executing a tool designation code included in the NC program and transmits to the tool change control part a signal for positioning the tool holder holding the recognized next tool at the tool change position, and the tool change control part drives the magazine driving mechanism in accordance with the received signal so as to position the designated tool holder at the tool change position.

On the other hand, the manual operation is performed by the operator inputting into the manual operation device information on a tool holder to be called to the tool attachment/detachment position. Generally, each of the tool holders has a serial number (tool holding number) assigned thereto, and, for example, this tool holding number is input into the manual operation device.

Once information on a tool holder to be called is input, the manual operation device transmits to the tool change control part an operation signal for moving the tool holder corresponding to the input information to the tool attachment/detachment position. When receiving this operation signal, the tool change control part confirms the status of operation of the numerical controller. In the case where the numerical controller is not executing an NC program, the tool change control part drives the magazine driving mechanism to move the tool holder corresponding to the operation signal to the tool attachment/detachment position.

On the other hand, in the case where the numerical controller is executing an NC program, the tool change control part checks the used tool information stored in the tool information storage to confirm whether the tool held by the tool holder corresponding to the operation signal is used in the NC program. In the case where the tool is not used, the tool change control part moves the tool holder to the tool attachment/detachment position, while in the case where the tool held by the tool holder corresponding to the operation signal is used in the NC program, the tool change control part causes the announcement part to announce an alarm indicating that the tool is scheduled to be used, that the tool is unavailable, or the like.

Thus, in the machine tool according to the present invention, when the operator manually moves (calls) a desired tool to the tool attachment/detachment position during a machining operation, if the operator makes an erroneous input into the manual operation device and thereby a tool holder holding a tool used in the machining operation is about to be called to the tool attachment/detachment position, an alarm is announced by the announcement part provided in the manual operation device; therefore, the operator can easily recognize his erroneous input. Further, the operator having recognized his erroneous input can take measures such as correcting the input to call a right tool holder to the tool attachment/detachment position. Taking such measures can prevent the occurrence of the conventional problem that the automatic tool change operation is interrupted and thereby the machining operation is interrupted.

Note that, in the present invention, any suitable means can be used for storing the used tool information into the tool information storage or updating the stored used tool information. However, it is preferred that a used tool information update part is provided in the machine tool to cause the used tool information update part to store the used tool information into the tool information storage or update the stored used tool information.

A manner using an external input may be employed for causing the used tool information update part to store the used tool information into the tool information storage or update the stored used tool information. In this case, based on an NC program that is going to be executed, the operator who operates the machine tool recognizes a tool used in the machining operation and inputs information on the recognized tool into the used tool information update part, thereby storing the used tool information into the tool information storage or updating the stored used tool information.

Alternatively, the used tool information update part may be configured to update the used tool information stored in the tool information storage (including storing thereof) by analyzing an NC program stored in the numerical controller. Further alternatively, the used tool information update part may be configured to update the used tool information stored in the tool information storage (including storing thereof) by analyzing an NC program being executed by the numerical controller. In such configurations, the used tool information can be stored into the tool information storage or updated without requiring the operator to perform any operation; therefore, artificial errors, such as the used tool information being erroneously input by the operator, are not caused.

Further, the tool information storage may be configured to further store therein a cumulative machining time of each of the tools held by the tool holders of the tool magazine and a limit machining time thereof, the machine tool may further include a machining time calculation part analyzing an NC program executed by the numerical controller to calculate a machining time of a tool used in a machining operation using the NC program, and updating the corresponding cumulative machining time of the tool stored in the tool information storage with the calculated machining time, and the used tool information update part may be further configured to monitor whether the cumulative machining time of each tool stored in the tool information storage has exceeded its limit machining time, and exclude a tool whose cumulative machining time has exceeded its limit machining time from the used tool specified based on the used tool information stored in the tool information storage.

According to the machine tool having this configuration, tool lives of the tools sored in the tool magazine can be managed. If a tool whose cumulative machining time has exceeded its limit machining time continues to be used for machining, problems such as that the tool is broken are likely to arise. Therefore, it is preferred that such a tool is exchanged with a new one as soon as possible even if the tool is used in the machining operation. In the above-described configuration, because a tool having exceeded its limit machining time is excluded from the used tool specified based on the used tool information stored in the tool information storage, an alarm is not announced by the announcement part even if the operator inputs into the manual operation device a command for calling the tool holder holding the tool to the tool attachment/detachment position to exchange the tool. Therefore, the operator can perform the tool exchange operation without being distracted.

Further, in the present invention, it is preferred that the tool change control part is configured, in the case where the tool held by the tool holder corresponding to the operation signal is used in the machining operation being executed by the numerical controller, not to move the tool holder to the tool attachment/detachment position. The reason therefor is that, if the tool magazine is actuated by an erroneous input made by the operator, not only is the actuation per se wasted, but also energy is wasted.

Alternatively, the tool change control part may be configured, in the case where the tool held by the tool holder corresponding to the operation signal is used in the machining being executed by the numerical controller, to move the tool holder to the tool attachment/detachment position only when further receiving an execution signal from the manual operation device after the announcement of the alarm. When there is some reason, for example, when it is visually confirmed that a tool which is used in the machining operation and whose cumulative machining time has not exceeded its limit machining time is broken, the operator has to exchange the tool. In the above configuration, although an alarm is announced by the announcement part when the operator inputs into the manual operation device a command for calling the tool holder holding the tool to the tool attachment/detachment position, the tool holder is called to the tool attachment/detachment position by the operator further inputting an execution signal through the manual operation device; therefore, the operator can perform a necessary tool exchange operation.

Advantageous Effects of Invention

As described above, according to the present invention, when the operator manually moves a desired tool to the tool attachment/detachment position during a machining operation, if the operator makes an erroneous input into the manual operation device and thereby a tool holder holding a tool used in the machining operation is about to be called to the tool attachment/detachment position, an alarm is announced by the announcement part provided in the manual operation device; therefore, the operator can easily recognize his erroneous input. Further, the operator having recognized his erroneous input can take measures such as correcting the input to call a right tool holder to the tool attachment/detachment position. Taking such measures can prevent the occurrence of the conventional problem that the automatic tool change operation is interrupted and thereby the machining operation is interrupted.

BRIEF DESCRIPTION OF DRAWINGS

FIG. 2 is an illustration for explaining tool information stored in a tool information storage in the embodiment;

DESCRIPTION OF EMBODIMENTS

Figure 1:
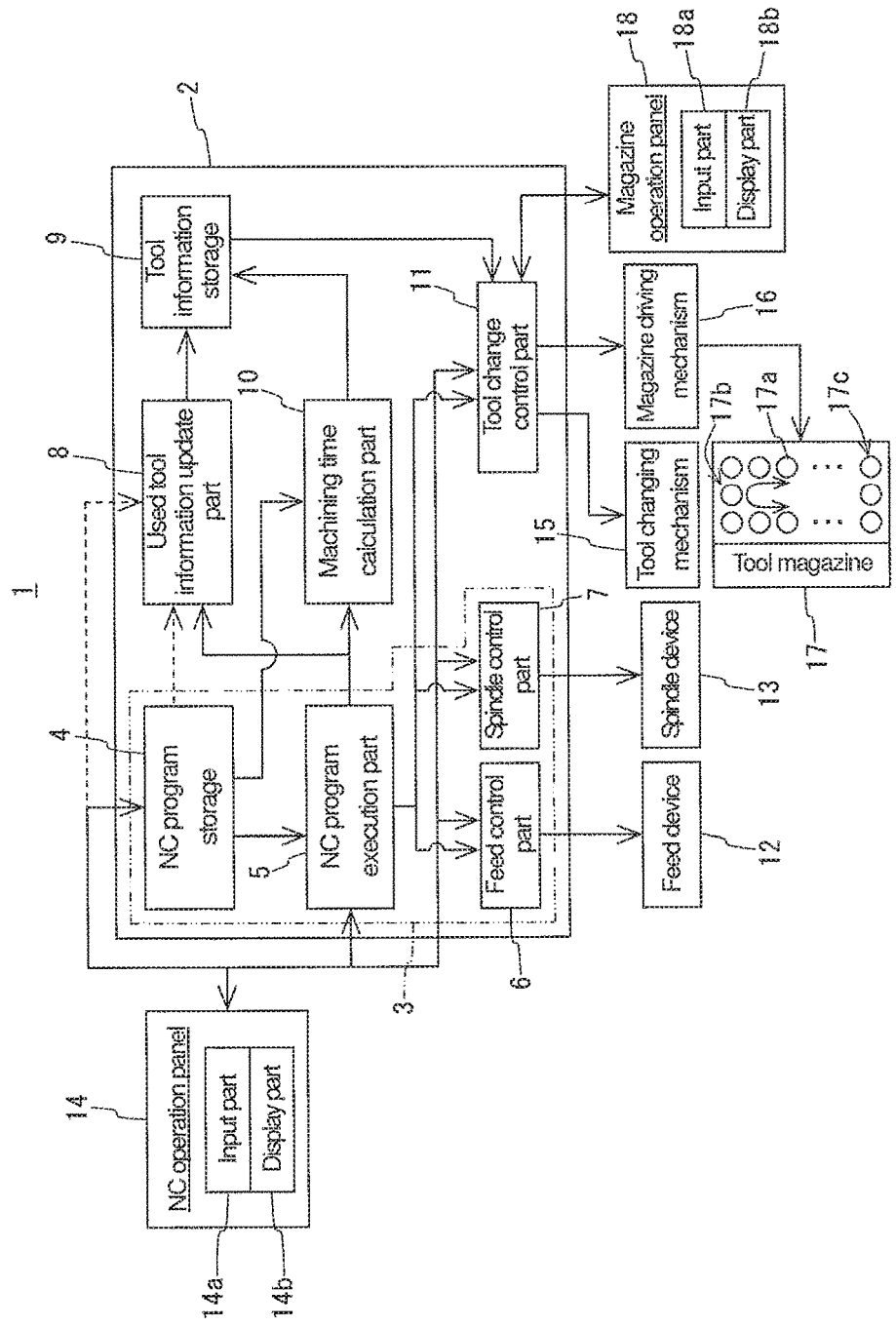
FIG. 1 is a block diagram showing a schematic configuration of a machine tool according to an embodiment of the present invention.

Hereinafter, a specific embodiment of the present invention will be described with reference to the drawings. FIG. 1 is a block diagram showing a schematic configuration of a machine tool according to the embodiment of the present invention.

As shown in FIG. 1, the machine tool 1 according to this embodiment is composed of a controller 2, a feed device 12, a spindle device 13, an NC operation panel 14, a tool changing mechanism 15, a magazine driving mechanism 16, a tool magazine 17, a magazine operation panel 18, and other components. Further, the controller 2 consists of an NC program storage 4, an NC program execution part 5, a feed control part 6, a spindle control part 7, a used tool information update part 8, a tool information storage 9, a machining time calculation part 10, and a tool change control part 11; the NC program storage 4, the NC program execution part 5, the feed control part 6, and the spindle control part 7 form a numerical control part 3.

The feed device 12 and the spindle device 13 form a motion mechanism part of the machine tool 1. For example, in the case where the machine tool 1 is a machining center, the feed device 12 has a function of relatively moving a table, which is not shown in the drawings, and the spindle device 13 in a three-dimensional space. Further, the spindle device 13 includes a spindle to which a tool is attached and a spindle motor rotating the spindle about an axis thereof.

The tool magazine 17 is composed of at least two sprockets (not shown) disposed with an appropriate space therebetween, an endless annular chain (not shown) wound around the sprockets (not shown), and a plurality of tool pots 17a coupled to the chain (not shown) at appropriate intervals, each of the tool pots 17a holding a tool. Further, the magazine driving mechanism 16 is connected to one of the sprockets (not shown), and the magazine driving mechanism 16 rotates the sprocket (not shown) about an axis thereof to move the chain (not shown) and the tool pots 17a in the direction indicated by arrow, thereby causing the tool pots 17a to move through a tool change position 17b and a tool attachment/detachment position 17c.

Further, the tool changing mechanism 15 changes a tool attached to the spindle of the spindle device 13 with a tool held by a tool pot 17a positioned at the tool change position 17b. An exemplary specific configuration of the tool changing mechanism 15 includes, for example, a change arm having tool grippers at both ends thereof, a support shaft provided parallel to the spindle for supporting the change arm, a rotating mechanism rotating the change arm about an axis of the support shaft, and a moving mechanism moving the change arm forward and backward along the support shaft.

According to this tool changing mechanism 15, a tool attached to the spindle is changed with a next tool positioned at the tool change position 17b by executing 1) a gripping operation of rotating the change arm about the axis of the support shaft from an original position (an angular position at which the change arm is in a standby state) so as to cause one of the tool grippers of the change arm to grip the tool attached to the spindle and cause the other of the tool grippers to grip the next tool positioned at the tool change position 17b, 2) a pulling operation of moving the change arm forward along the support shaft so as to pull the tool out of the spindle, 3) a positioning operation of rotating the change arm about the axis of the support shaft so as to position the next tool gripped by the other of the tool grippers on an axis of the spindle, 4) an attaching operation of moving the change arm backward along the support shaft so as to attach the next tool gripped by the other of the tool grippers to the spindle, and 5) a returning operation of rotating the change arm about the axis of the support shaft so as to return the change arm to the original position.

The NC operation panel 14 includes an input part 14a and a display part 14b and is configured to be capable of performing, through the input part 14a, a processing of storing an NC program into the NC program storage 4 and a processing of inputting control signals into the NC program execution part 5, the feed control part 6, and the spindle control part 7. Further, the display part 14 is configured to display an NC program stored in the NC program storage 4, the status of execution in the NC program execution part 5, and the status of operations of the feed device 12 and spindle device 13.

The magazine operation panel 18 similarly includes an input part 18a and a display part 18b, and is configured to be capable of inputting the number of a tool pot 17a to be called to the tool attachment/detachment position 17c into the tool change control part 11 through the input part 18a. Further, the display part 18b is configured to, when receiving an "UNAVAILABLE" signal that is transmitted from the tool change control part 11, display a screen (alarm screen) indicating that the tool is unavailable.

The feed control part 6 is a functional unit that controls operation of the feed device 12, and the spindle control part 7 is a functional unit that controls operation of the spindle device 13. Further, the NC program storage 4 stores therein one or more NC programs, and the NC program execution part 5 reads out a designated NC program from the NC program storage 4 in accordance with a command input from the input part 14a, executes the NC program, and transmits control signals to the feed control part 6, the spindle control part 7, and the tool change control part 11. Note that, when an NC code is input as an MDI operation from the input part 14a, the NC program execution part 5 also executes this NC code and transmits control signals corresponding to the NC code to the feed control part 6, the spindle control part 7, and the tool change control part 11.

The tool information storage 9 is a functional unit that stores therein tool information as shown in FIG. 2. The tool information shown as an example in FIG. 2 includes a tool number set for each tool, the number of the tool pot 17a storing each tool in the tool magazine, the dimensions (diameter and length) of each tool, an NC program which uses each tool, a machining time of each tool in the NC program which uses the tool, a current cumulative machining time of each tool, a limit machining time set for each tool, and an "UNAVAILABLE" flag set for each tool. Note that the limit machining time is a cumulative machining time regarded as a wear limit of the tool, and is empirically set.

The machining time calculation part 10 performs a processing of analyzing NC programs stored in the NC program storage 4 to recognize the tool numbers designated in the NC programs and calculate the machining times of the tools, and writing the calculated machining times of the tools in the NC programs into the tool information storage 9. Note that this processing may be regularly performed; however, it is preferred that, each time a new NC program is stored into the NC program storage 4, the processing is performed on the new NC program, and each time an NC program stored in the NC program storage 4 is modified by editing or the like, the processing is performed on the modified NC program.

Further, the machining time calculation part 10 monitors the status of operation of the NC program execution part 5 to recognize an NC program executed in the NC program execution part 5. Each time execution of an NC program is finished, or each time a tool is pulled out of the spindle by the tool changing mechanism 15, the machining time calculation part 10 performs, with respect to each of the tools used in the machining operation using the NC program or with respect to the tool stored into the tool magazine 17 through the tool change operation, a processing of adding the machining time thereof stored in the tool information storage 9 to the cumulative machining time thereof stored in the tool information storage 9, thereby updating the cumulative machining time thereof.

The used tool information update part 8 performs a processing of writing data into the tool information storage 9 and a processing of updating data already stored in the tool information storage 9. Specifically, the used tool information update part 8 performs a processing of writing into the tool information storage 9 data on the tool pot number, tool name, dimensions, and limit machining time corresponding to the tool number, which data is input from the input part 14a of the NC operation panel 14.

Further, the used tool information update part 8 performs a processing of analyzing NC programs stored in the NC program storage 4 to recognize the tool numbers designated in the NC programs, that is, recognize the tools used in the machining operations using the NC programs, and writing, for each of the tools, the name of the NC program which uses the tool (the number of the NC program) into the tool information storage 9. Note that this processing may be regularly performed; however, it is preferred that, each time a new NC program is stored into the NC program storage 4, the processing is performed on the new NC program, and each time an NC program stored in the NC program storage 4 is modified by editing or the like, the processing is performed on the modified NC program.

Furthermore, the used tool information update part 8 monitors the status of operation of the NC program execution part 5. When an NC program is executed in the NC program execution part 5, the used tool information update part 8 checks the name of the executed NC program and recognizes the tools used in the NC program by referring to the tool information storage 9 based on the checked NC program name, and performs a processing of turning ON the "UNAVAILABLE" flag stored in the tool information storage 9 with respect to, of the recognized tools, a tool whose cumulative machining time stored in the tool information storage 9 has not exceeded its limit machining time, and turning OFF the "UNAVAILABLE" flag with respect to the other tools. For example, in the example shown in FIG. 2, in the case where the NC program executed in the NC program execution part 5 is O1000, the used tool information update part 8 turns ON the "UNAVAILABLE" flags for the tools with the tool numbers 001, 002, 020, etc. which are used in the machining operation using the NC program O1000 and whose cumulative machining times have not exceeded their respective limit machining times, and turns OFF the "UNAVAILABLE" flags for the tools other than them, such as the tool with the tool number 003, etc.

The tool change control part 11 receives control signals transmitted from the NC program execution part 5 or the input part 14a of the NC operation panel 14, and controls operations of the tool changing mechanism 15 and magazine driving mechanism 16 in accordance with the received control signals. For example, when receiving from the NC program execution part 5 or the input part 14a a control signal for calling a next tool to the tool change position 17b, the tool change control part 11 drives and controls the magazine driving mechanism 16 to move the tool pot 17a holding the tool corresponding to the control signal to the tool change position 17b. Further, when receiving a tool change command from the NC program execution part 5 or the input part 14a, the tool change control part 11 drives and controls the tool changing mechanism 15 to cause the tool changing mechanism 15 to execute the tool change operation.

Further, when receiving an operation signal input from the magazine operation panel 18, that is, an operation signal for moving a particular tool pot 17a to the tool attachment/detachment position 17c, the tool change control part 11 first confirms whether the NC program execution part 5 is executing an NC program. In the case where the NC program execution part 5 is executing an NC program, the tool change control part 11 further confirms, by referring to the tool information storage 9, whether the tool pot 17a corresponding to the operation signal holds a tool for which the "UNAVAILABLE" flag is ON. In the case where the "UNAVAILABLE" flag is OFF, the tool change control part 11 drives and controls the magazine driving mechanism 16 to move the tool pot 17a corresponding to the operation signal to the tool attachment/detachment position 17c, while in the case where the "UNAVAILABLE" flag is ON, the tool change control part 11 transmits an "UNAVAILABLE" signal to the display part 18b without moving the tool pot 17a corresponding to the operation signal. Further, in the case where the NC program execution part 5 is not executing an NC program, the tool change control part 11 drives and controls the magazine driving mechanism 16 to move the tool pot 17a corresponding to the operation signal to the tool attachment/detachment position 17c.

Next, a manual operation performed by the operator through the magazine operation panel 18 in the machine tool 1 according to this embodiment having the above-described configuration is described.

The manual operation is an operation in which the operator calls a particular tool pot 17a of the tool magazine 17 to the tool attachment/detachment position 17c through the magazine operation panel 18; the operator attaches a tool to the tool pot 17a called to the tool attachment/detachment position 17c or detaches the tool from the called tool pot 17a.

In this manual operation, the operator first inputs, through the input part 18a of the magazine operation panel 18, the number of a tool pot 17a to be called to the tool attachment/detachment position 17c. Once the number of the tool pot 17a is input, the input part 18a transmits to the tool change control part 11 an operation signal for moving the tool pot 17a with the input number to the tool attachment/detachment position 17c.

When receiving this operation signal, the tool change control part 11 confirms whether the NC program execution part 5 is executing an NC program. In the case where the NC program execution part 5 is not executing an NC program, the tool change control part 11 drives and controls the magazine driving mechanism 16 to move the tool pot 17a corresponding to the operation signal to the tool attachment/detachment position 17c, so that the operator can attach a tool to the called tool pot 17a or detach a tool from the called tool pot 17a.

On the other hand, in the case where the NC program execution part 5 is executing an NC program when the operation signal is received, the tool change control part 11 further confirms, by referring to the data stored in the tool information storage 9, whether the "UNAVAILABLE" flag for the tool pot 17a corresponding to the operation signal is ON. In the case where the "UNAVAILABLE" flag for the tool pot 17a is OFF, the tool change control part 11 drives and controls the magazine driving mechanism 16 to move the tool pot 17a corresponding to the operation signal to the tool attachment/detachment position 17c. Thus, even when the NC program executing part 5 is executing an NC program, in the case where the tool to be called is not a tool used in the NC program and in the case where the tool is a tool which is used in the NC program but whose cumulative machining time has exceeded its limit machining time, the tool pot 17a holding the tool is called to the tool attachment/detachment position 17c.

By contrast, in the case where the "UNAVAILABLE" flag for the tool pot 17a is ON, the tool change control part 11 transmits an "UNAVAILABLE" signal to the display part 18b without moving the tool pot 17a to the tool attachment/detachment position 17c. When receiving the "UNAVAILABLE" signal, the display part 18b displays a screen (alarm screen) indicating that the tool pot 17a is unavailable.

Thus, according to the machine tool 1 in this embodiment, when the operator manually calls a desired tool to the tool attachment/detachment position 17c during a machining operation, if the operator makes an erroneous input into the input part 18a of the magazine operation panel 18 and thereby a tool pot 17a holding a tool which is used in the machining operation is about to be called to the tool attachment/detachment position 17c, an alarm screen indicating that the tool is unavailable is displayed on the display part 18*b* of the magazine operation panel 18; therefore, the operator can easily recognize his erroneous input.

Further, the operator having recognized his erroneous input can take measures such as correcting the input, that is, calling a tool pot 17*a* holding a tool which is not used in the machining operation to the tool attachment/detachment position 17*c*. Taking such measures can prevent the occurrence of the conventional problem that an automatic tool change operation is interrupted and thereby the machining operation is interrupted.

Further, in this embodiment, because a tool pot 17*a* for which the "UNAVAILABLE" flag is ON is not moved to the tool attachment/detachment position 17*c*, an unnecessary operation due to an operator's erroneous input can be avoided, and therefore waste of energy can be prevented.

Further, in this embodiment, because the cumulative machining time and limit machining time of each tool are stored in the tool information storage 9, tool lives of the tools stored in the tool magazine 17 can be managed.

Note that, if a tool whose cumulative machining time has exceeded its limit machining time continues to be used for machining, problems such as that the tool is broken are likely to arise. Therefore, it is preferred that such a tool is exchanged with a new one as soon as possible even if it is used in the machining operation. In this embodiment, the "UNAVAILABLE" flag stored in the tool information storage 9 is turned OFF with respect to a tool whose cumulative machining time has exceeded its limit machining time; therefore, even if the tool is a tool which is used in the current machining operation, the operator can call the tool to the tool attachment/detachment position 17*c* to exchange it with a new one as appropriate. Further, in this process, an alarm screen indicating that the input is erroneous is not displayed on the display part 18*b*; therefore, the operator can perform the exchange operation without being distracted.

Thus, a specific embodiment of the present invention has been described; however, the present invention is not limit thereto and can be implemented in other modes.

For example, in the above embodiment, the tool change control part 11 is configured to, when receiving an operation signal from the input part 18*a* while the NC program execution part 5 is executing an NC program, determine whether to move the tool pot 17*a* corresponding to the operation signal to the tool attachment/detachment position 17*c* based on whether the "UNAVAILABLE" flag stored in the tool information storage 9 is ON or OFF. However, the present invention is not limited thereto, and the tool change control part 11 may be configured to recognize the name of the NC program being executed by the NC program execution part 5 and determine, by referring to the relationship between the applied program name and the tool pot 17*a* stored in the tool information storage 9 based on the recognized program name, whether the tool pot 17*a* corresponding to the operation signal is used in the machining operation, thereby determining whether to move the tool pot 17*a* to the tool attachment/detachment position 17*c*. However, for achieving a rapid processing, the determination based on the "UNAVAILABLE" flag as employed in the above embodiment is preferred.

Further, in the above embodiment, the used tool information update part 8 is configured to analyze NC programs stored in the NC program storage 4 to recognize the relationship between each NC program name and the tool numbers (tools) used in the NC program, and store the correlation between them into the tool information storage 9, and is configured to, when the NC program execution part 5 executes an NC program, recognize the tools used in the NC program based on the NC program name and the correlation stored in the tool information storage 9, and turn ON the "UNAVAILABLE" flags for the tools stored in the tool information storage 9. However, the configuration of the used tool information update part 8 is not limited thereto.

For example, the used tool information update part 8 may be configured to, when the NC program execution part 5 executes an NC program, read ahead the NC program to recognize the tools used in the NC program, and turn ON the "UNAVAILABLE" flag stored in the tool information storage 9 with respect to the recognized tools. In this case, the tool information storage 9 does not necessarily store therein data on the applied program.

Further, in the case where the used tool information update part 8 is configured to, when the NC program execution part 5 executes an NC program, recognize the used tools from the NC program and turn ON the "UNAVAILABLE" flag stored in the tool information storage 9 with respect to the recognized tools, it is preferred that the NC program has a form in which all of the tools used in the NC program are written at the beginning of the NC program, together with an NC code meaning that the tools are used in the NC program.

Figure 3:
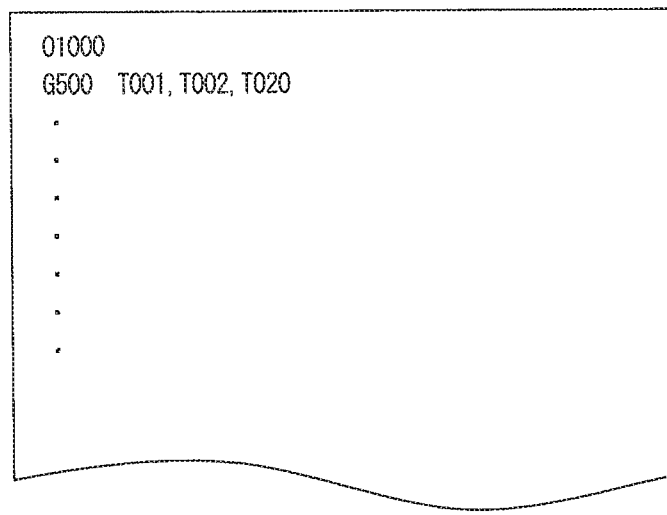
FIG. 3 is an illustration showing an example of an NC program in another embodiment of the present invention.

An example of such an NC program is shown in FIG. 3. In FIG. 3, a G code G500 defines that tool numbers (T numbers) written in the block thereof, that is, T001, T002, and T020, are used in the machining operation. Therefore, in this case, the G500 written at the beginning of the NC program allows the used tool information update part 8 to recognize that T001, T002, and T020 are used in the machining operation and perform the processing of turning ON the "UNAVAILABLE" flag stored in the tool information storage 9 with respect to the recognized tools, without reading ahead the entire NC program.

Figure 4:
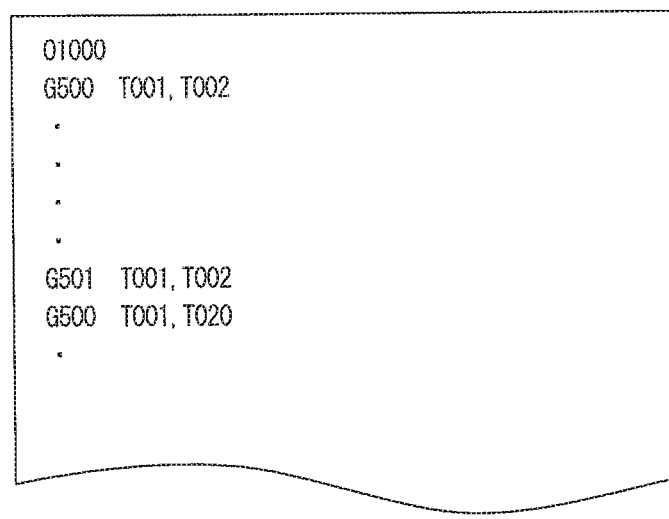
FIG. 4 is an illustration showing an example of an NC program in another embodiment of the present invention.

Further, in such an embodiment that all of the used tools are written together in the NC program, as shown in FIG. 4, the machining operation may be divided into several sections using a G code defining the tools used in the following machining (G500) and a G code removing the definition (G501), and the used tools may be defined for each of the sections. In the example shown in FIG. 4, it is recognized in the used tool information update part 8 that T001 and T002 are used in the initial machining section, and the used tool information update part 8 performs the processing of turning ON the "UNAVAILABLE" flag stored in the tool information storage 9 with respect to only the tools T001 and T002 during the machining corresponding to this section. Further, it is recognized in the used tool information update part 8 that T001 and T020 are used in the subsequent machining section, and the used tool information update part 8 performs the processing of turning ON the "UNAVAILABLE" flag stored in the tool information storage 9 with respect to only the tools T001 and T020 during the machining corresponding to this section. In such a configuration, the tools being used for machining can be defined at smaller intervals, and therefore unavailable tools can be set at smaller intervals, which can loosen the operational restrictions for the operator.

Note that the NC code defining the used tools is not limited to a G code and, as a matter of course, another code may be used, such as an M code.

Further, the above embodiment is configured so that, when a machining operation is executed by the NC program execution part 5, the used tool information update part 8 analyzes the executed NC program and updates the "UNAVAILABLE" flag stored in the tool information storage 9. However, the present invention is not limited thereto, and a configuration is possible in which the operator updates the "UNAVAILABLE" flag stored in the tool information storage 9 with respect to the tools used in the machining operation executed by the NC program execution part 5 through the input part 14a of the NC operation panel 14. The operator operates the machining operation by himself; therefore, he naturally knows the tools used in the machining operation. Therefore, the operator can update the "UNAVAILABLE" flag stored in the tool information storage 9 by himself. However, for avoiding the operator making an erroneous input, it is preferred that the "UNAVAILABLE" flag stored in the tool information storage 9 is updated by the used tool information update part 8 as in the above embodiment.

Further, in the above embodiment, the tool change control part 11 is configured to, in the case where the "UNAVAILABLE" flag stored in the tool information storage 9 is ON with respect to the tool pot 17a corresponding to an operation signal input from the input part 18a of the magazine operation panel 18 during a machining operation, transmit an "UNAVAILABLE" signal to the display part 18b to display on the display part 18b an alarm screen indicating that the tool pot 17a is unavailable, without moving the tool pot 17a to the tool attachment/detachment position 17c. However, the tool change control part 11 may be configured to move the tool pot 17a to the tool attachment/detachment position 17c if further receiving an execution signal for moving the tool pot 17a to the tool attachment/detachment position 17c from the input part 18a after the display on the display part 18b.

When there is some reason, for example, when it is visually confirmed that a tool which is used in the machining operation and whose cumulative machining time has not exceeded its limit machining time is broken, the operator has to exchange the tool. In the above configuration, although an alarm screen is displayed on the display part 18b when the operator inputs through the input part 18a a command for calling the tool pot 17a holding the tool to the tool attachment/detachment position 17c, the tool pot 17a is called to the tool attachment/detachment position 17c by the operator further inputting an execution signal through the input part 18a; therefore, the operator can perform a necessary tool exchange operation.

Further, the above embodiment is configured so that, in the case where the "UNAVAILABLE" flag stored in the tool information storage 9 is ON with respect to the tool pot 17a corresponding to an operation signal input from the input part 18a during a machining operation, an alarm screen indicating that the tool pot 17a is unavailable is displayed on the display part 18b. However, the present invention is not limited thereto, and, in the case where the "UNAVAILABLE" flag is ON, this may be announced by means of a sound using a speaker or the like, or by another means.

Further, the above embodiment is configured so that the tools used in an executed NC program are recognized as "unavailable". However, the present invention is not limited to such recognition and the used tools may be recognized as "scheduled to be used", for example.

Further, the above embodiment employs the so-called fixed number method in which the tool pots 17a and the tools held by them are fixed. However, the present invention is not limited to the fixed number method and the so-called random number method may be employed. In this case, the tool change control part 11 is configured to, each time the tool change operation is executed, based on the relationship between the tool pot 17a changed by the tool change operation and the tool held by the tool pot 17a, update the tool pot number corresponding to the tool number stored in the tool information storage 9 in accordance with the relationship.

REFERENCE SIGNS LIST

1 Machine tool
2 Controller
3 Numerical controller
4 NC program storage
5 NC program execution part
6 Feed control part
7 Spindle control part
8 Used tool information update part
9 Tool information storage
10 Machining time calculation part
11 Tool change control part
12 Feed device
13 Spindle device
14 NC operation panel
15 Tool changing mechanism
16 Magazine driving mechanism
17 Tool magazine
18 Magazine operation panel
18a Display part

The invention claimed is:

1. A machine tool, comprising:
a motion mechanism part including a spindle;
a numerical controller controlling operation of the motion mechanism part in accordance with a numerical control program; and
a tool changer, the tool changer including:
a tool magazine having a plurality of tool holders, wherein each of the plurality of tool holders holds a respective tool therein, and the plurality of tool holders are indexable such that each of the plurality of tool holders is movable, as required, to a tool change position for exchange of the respective tool held therein with a tool attached to the spindle, and the plurality of tool holders are also indexable such that each of the plurality of tool holders is movable, as required, to a tool attachment/detachment position for a manual exchange by an operator of the respective tool held therein;
a tool changing mechanism having a change arm for changing the tool attached to the spindle with the respective tool that is held by a selected one of the plurality of tool holders that is positioned at the tool change position;
a tool change control part controlling operations of the tool changing mechanism; and
a manual operation device at which the operator inputs into the tool change control part an operation signal for selectively moving a particular one of the plurality of tool holders to the tool attachment/detachment position, wherein the manual operation device includes an announcement part for announcing an alarm to the operator, the machine tool further comprising:
a tool information storage storing therein used tool information for, when the numerical controller executes the numerical control program, specifying the respective tool used in a machining operation using the numerical control program, wherein
the tool change control part is configured to check the used tool information stored in the tool information storage when receiving the operation signal from the manual operation device during execution of the numerical control program by the numerical controller, and, in a case where the respective tool held by the particular one of the plurality of tool holders corresponding to the operation signal is not used in the numerical control program, move the particular one of the plurality of tool holders to the tool attachment/detachment position and, in a case where the respective tool held by the one of the plurality of tool holders corresponding to the operation signal is used in the numerical control program, cause the announcement part to announce the alarm.

2. The machine tool according to claim 1, wherein the machine tool comprises a used tool information update part updating the used tool information stored in the tool information storage.

3. The machine tool according to claim 2, wherein the used tool information update part is configured to update the used tool information stored in the tool information storage by using an external input.

4. The machine tool according to claim 3, wherein the tool change control part is configured, in the case where the respective tool held by the particular one of the plurality of tool holders corresponding to the operation signal is used in the machining operation being executed by the numerical controller, not to move the tool holder to the tool attachment/detachment position.

5. The machine tool according to claim 3, wherein the tool change control part is configured, in the case where the respective tool held by the particular one of the plurality of tool holders corresponding to the operation signal is used in the machining operation being executed by the numerical controller, to move the particular one of the plurality of tool holders to the tool attachment/detachment position only when further receiving an execution signal from the manual operation device after the announcement of the alarm.

6. The machine tool according to claim 2, wherein the used tool information update part is configured to update the used tool information stored in the tool information storage by analyzing the numerical control program stored in the numerical controller.

7. The machine tool according to claim 6, wherein the tool change control part is configured, in the case where the respective tool held by the particular one of the plurality of tool holders corresponding to the operation signal is used in the machining operation being executed by the numerical controller, not to move the tool holder to the tool attachment/detachment position.

8. The machine tool according to claim 6, wherein the tool change control part is configured, in the case where the respective tool held by the particular one of the plurality of tool holders corresponding to the operation signal is used in the machining operation being executed by the numerical controller, to move the particular one of the plurality of tool holders to the tool attachment/detachment position only when further receiving an execution signal from the manual operation device after the announcement of the alarm.

9. The machine tool according to claim 2, wherein the used tool information update part is configured to update the used tool information stored in the tool information storage by analyzing the numerical control program being executed by the numerical controller.

10. The machine tool according to claim 9, wherein the tool change control part is configured, in the case where the respective tool held by the particular one of the plurality of tool holders corresponding to the operation signal is used in the machining operation being executed by the numerical controller, not to move the tool holder to the tool attachment/detachment position.

11. The machine tool according to claim 9, wherein the tool change control part is configured, in the case where the respective tool held by the particular one of the plurality of tool holders corresponding to the operation signal is used in the machining operation being executed by the numerical controller, to move the particular one of the plurality of tool holders to the tool attachment/detachment position only when further receiving an execution signal from the manual operation device after the announcement of the alarm.

12. The machine tool according to claim 2, wherein:
the tool information storage is configured to further store therein a cumulative machining time of each of the respective tools held by the plurality of tool holders of the tool magazine and a limit machining time thereof;
the machine tool further comprises a machining time calculation part analyzing the numerical control program executed by the numerical controller to calculate a machining time of the respective tool used in a machining operation using the numerical control program, and updating the corresponding cumulative machining time with addition of the calculated machining time; and
the used tool information update part is further configured to monitor whether the stored cumulative machining time of each of the respective tools has exceeded its limit machining time, and exclude a given tool of the respective tools held by the plurality of tool holders whose cumulative machining time has exceeded its limit machining time from the used tool specified based on the used tool information stored in the tool information storage.

13. The machine tool according to claim 12, wherein the tool change control part is configured, in the case where the respective tool held by the particular one of the plurality of tool holders corresponding to the operation signal is used in the machining operation being executed by the numerical controller, not to move the tool holder to the tool attachment/detachment position.

14. The machine tool according to claim 12, wherein the tool change control part is configured, in the case where the respective tool held by the particular one of the plurality of tool holders corresponding to the operation signal is used in the machining operation being executed by the numerical controller, to move the particular one of the plurality of tool holders to the tool attachment/detachment position only when further receiving an execution signal from the manual operation device after the announcement of the alarm.

15. The machine tool according to claim 2, wherein the tool change control part is configured, in the case where the respective tool held by the particular one of the plurality of tool holders corresponding to the operation signal is used in the machining operation being executed by the numerical controller, not to move the tool holder to the tool attachment/detachment position.

16. The machine tool according to claim 2, wherein the tool change control part is configured, in the case where the respective tool held by the particular one of the plurality of tool holders corresponding to the operation signal is used in the machining operation being executed by the numerical controller, to move the particular one of the plurality of tool holders to the tool attachment/detachment position only when further receiving an execution signal from the manual operation device after the announcement of the alarm.

17. The machine tool according to claim 1, wherein the tool change control part is configured, in the case where the respective tool held by the particular one of the plurality of tool holders corresponding to the operation signal is used in the machining operation being executed by the numerical controller, not to move the tool holder to the tool attachment/detachment position.

18. The machine tool according to claim 1, wherein the tool change control part is configured, in the case where the respective tool held by the particular one of the plurality of tool holders corresponding to the operation signal is used in the machining operation being executed by the numerical controller, to move the particular one of the plurality of tool holders to the tool attachment/detachment position only when further receiving an execution signal from the manual operation device after the announcement of the alarm.

\* \* \* \* \*